(12) United States Patent
Hong

(10) Patent No.: US 11,221,634 B2
(45) Date of Patent: Jan. 11, 2022

(54) UNMANNED AERIAL VEHICLE CONTROL METHOD AND DEVICE, UNMANNED AERIAL VEHICLE AND REMOTE CONTROL DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 172 days.

(21) Appl. No.: 16/636,133

(22) PCT Filed: Aug. 3, 2017

(86) PCT No.: PCT/CN2017/095863
§ 371 (c)(1),
(2) Date: Feb. 3, 2020

(87) PCT Pub. No.: WO2019/024053
PCT Pub. Date: Feb. 7, 2019

(65) Prior Publication Data
US 2020/0186238 A1 Jun. 11, 2020

(51) Int. Cl.
*H04W 4/00* (2018.01)
*G05D 1/10* (2006.01)
(Continued)

(52) U.S. Cl.
CPC ............ *G05D 1/10* (2013.01); *B64C 39/024* (2013.01); *G05D 1/0022* (2013.01);
(Continued)

(58) Field of Classification Search
CPC ..... H04W 28/04; H04W 72/04; H04W 76/14; H04W 76/10; H04W 72/042;
(Continued)

(56) References Cited
U.S. PATENT DOCUMENTS 9,412,278 B1 * 8/2016 Gong .................. G08G 5/0043
2016/0300492 A1 * 10/2016 Pasko .................. G08G 5/006
(Continued)

FOREIGN PATENT DOCUMENTS

| CN | 104950906 A | 9/2015 |
| CN | 105242686 A | 1/2016 |
| CN | 106716973 A | 5/2017 |

OTHER PUBLICATIONS

Extended European Search Report in European Application No. 17919865.0, dated Feb. 16, 2021.
(Continued)

*Primary Examiner* — Phuongchau Ba Nguyen
(74) *Attorney, Agent, or Firm* — Finnegan, Henderson, Farabow, Garrett & Dunner, L.L.P.

(57) ABSTRACT

An unmanned aerial vehicle control method includes: sending a random access request to a base station; sending connection success information to a remote control device according to identification information of the remote control device, after a communication connection with the base station is established; receiving a control signal sent by the remote control device through the base station; and performing an operation according to the control signal.

12 Claims, 10 Drawing Sheets

(51) Int. Cl.
  *B64C 39/02*  (2006.01)
  *G05D 1/00*  (2006.01)
  *H04B 7/185*  (2006.01)
  *H04W 36/00*  (2009.01)
  *H04W 74/00*  (2009.01)
  *H04W 74/08*  (2009.01)

(52) U.S. Cl.
  CPC .... *H04B 7/18506* (2013.01); *H04W 36/0011* (2013.01); *H04W 74/004* (2013.01); *H04W 74/008* (2013.01); *H04W 74/0833* (2013.01)

(58) Field of Classification Search
  CPC ............. H04W 88/08; H04W 36/0011; H04W 74/004; H04W 74/008; H04W 74/0833; H04L 5/0007; G05D 1/10; G05D 1/0022; B64C 39/024; G08C 2201/42; G08C 17/02; H04B 7/18504; H04B 7/18506
  See application file for complete search history.

(56) References Cited

U.S. PATENT DOCUMENTS

| | | | |
|---|---|---|---|
| 2016/0330771 A1* | 11/2016 | Tan | H04W 72/08 |
| 2017/0146990 A1 | 5/2017 | Wang et al. | |
| 2020/0280585 A1* | 9/2020 | Zheng | H04W 4/40 |

OTHER PUBLICATIONS

English version of International Search Report in PCT Application No. PCT/CN2017/095863 dated Apr. 26, 2018.

\* cited by examiner

UNMANNED AERIAL VEHICLE CONTROL METHOD AND DEVICE, UNMANNED AERIAL VEHICLE AND REMOTE CONTROL DEVICE

CROSS REFERENCE TO RELATED APPLICATIONS

This application is a national phase application based on PCT/CN2017/095863, filed Aug. 3, 2017, the content of which is incorporated herein by reference.

TECHNICAL FIELD

The present disclosure relates to the field of unmanned aerial vehicles (UAVs), and in particular, to a UAV control method, a UAV control apparatus, a UAV, a remote control device, and a computer readable storage medium.

BACKGROUND

So far, UAVs are mainly controlled by remote control devices, and in order to make the UAVs applicable to a wider range of scenarios, attempts are being made to apply UAVs to cellular networks.

SUMMARY

The present disclosure provides a UAV control method, a UAV control apparatus, a UAV, a remote control device, and a computer readable storage medium to solve the deficiencies in the related art.

According to a first aspect of an embodiment of the present disclosure, there is provided an unmanned aerial vehicle (UAV) control method, including:
  sending a random access request to a base station;
  after a communication connection with the base station is established, sending connection success information to a remote control device according to identification information of the remote control device;
  receiving a control signal sent by the remote control device through the base station; and
  performing an operation according to the control signal.

According to a second aspect of an embodiment of the present disclosure, there is provided an unmanned aerial vehicle (UAV) control method, including:
  receiving connection success information sent by a UAV indicating that the UAV has established a communication connection with a base station; and
  sending a control signal to the UAV according to identification information of the UAV to control the UAV to perform an operation.

According to a third aspect of an embodiment of the present disclosure, there is provided an unmanned aerial vehicle (UAV) control apparatus, including:
  a random access module configured to send a random access request to a base station;
  a connection sending module configured to, after a communication connection with the base station is established, send connection success information to a remote control device according to identification information of the remote control device;
  a receiving module configured to receive a control signal sent by the remote control device through the base station; and
  a performing module configured to perform an operation according to the control signal.

According to a fourth aspect of an embodiment of the present disclosure, there is provided an unmanned aerial vehicle (UAV) control apparatus, including:
  a connection receiving module configured to receive connection success information sent by a UAV indicating that the UAV has established a communication connection with a base station; and
  a control sending module configured to send a control signal to the UAV according to identification information of the UAV, to control the UAV to perform an operation.

According to a fifth aspect of an embodiment of the present disclosure, there is provided an unmanned aerial vehicle (UAV), including:
  a processor; and
  a memory for storing processor executable instructions;
  wherein the processor is configured to:
  send a random access request to a base station;
  after a communication connection with the base station is established, send connection success information to a remote control device according to identification information of the remote control device;
  receive a control signal sent by the remote control device through the base station; and
  perform an operation according to the control signal.

According to a sixth aspect of an embodiment of the present disclosure, there is provided a remote control device, including:
  a processor; and
  a memory for storing processor executable instructions;
  wherein the processor is configured to:
  receive connection success information sent by an unmanned aerial vehicle (UAV) indicating that the UAV has established a communication connection with a base station; and
  send a control signal to the UAV according to identification information of the UAV to control the UAV to perform an operation.

According to a seventh aspect of an embodiment of the present disclosure, there is provided a computer readable storage medium having stored thereon a computer program, wherein the program, when executed by a processor, implements steps of:
  sending a random access request to a base station;
  after a communication connection with the base station is established, sending connection success information to a remote control device according to identification information of the remote control device;
  receiving a control signal sent by the remote control device through the base station; and
  performing an operation according to the control signal.

According to an eighth aspect of an embodiment of the present disclosure, there is provided a computer readable storage medium having stored thereon a computer program, wherein the program, when executed by a processor, implements steps of:
  receiving connection success information sent by an unmanned aerial vehicle (UAV) indicating that the UAV has established a communication connection with a base station; and
  sending a control signal to the UAV according to identification information of the UAV to control the UAV to perform an operation.

The technical solutions provided by the embodiments of the present disclosure can include the following beneficial effects.

It can be seen from the above, after the UAV randomly accesses a certain base station in the cellular network, connection success information may be sent to the remote control device corresponding to the identification information of the remote control device, so that the remote control device can determine in a timely manner that the UAV has established a communication connection with the base station, and then can send a control signal to the UAV through the base station, to control the UAV to perform corresponding operation timely.

Also, comparing with implementing the control of the UAV by the remote control device through other communication manners, such as wifi, Bluetooth, or the like, implementing control of the UAV by the remote control device through the cellular network can allow the remote control device to control the UAV over a greater distance, and ensure the quality of communication between the remote control device and the UAV, since the cellular network and the corresponding base station are maintained and arranged by an operator and thus has wider coverage and greater stability.

It should be understood that both the foregoing general description and the following detailed description are exemplary and explanatory only and are not restrictive of the disclosure.

BRIEF DESCRIPTION OF THE DRAWINGS

In order to more clearly illustrate the technical solutions in the embodiments of the present disclosure, the drawings used in the description of the embodiments will be briefly described below. Apparently, the drawings in the following description are only some embodiments of the present disclosure. Other drawings may also be obtained from theses drawings by those of ordinary skill in the art without paying creative labor.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
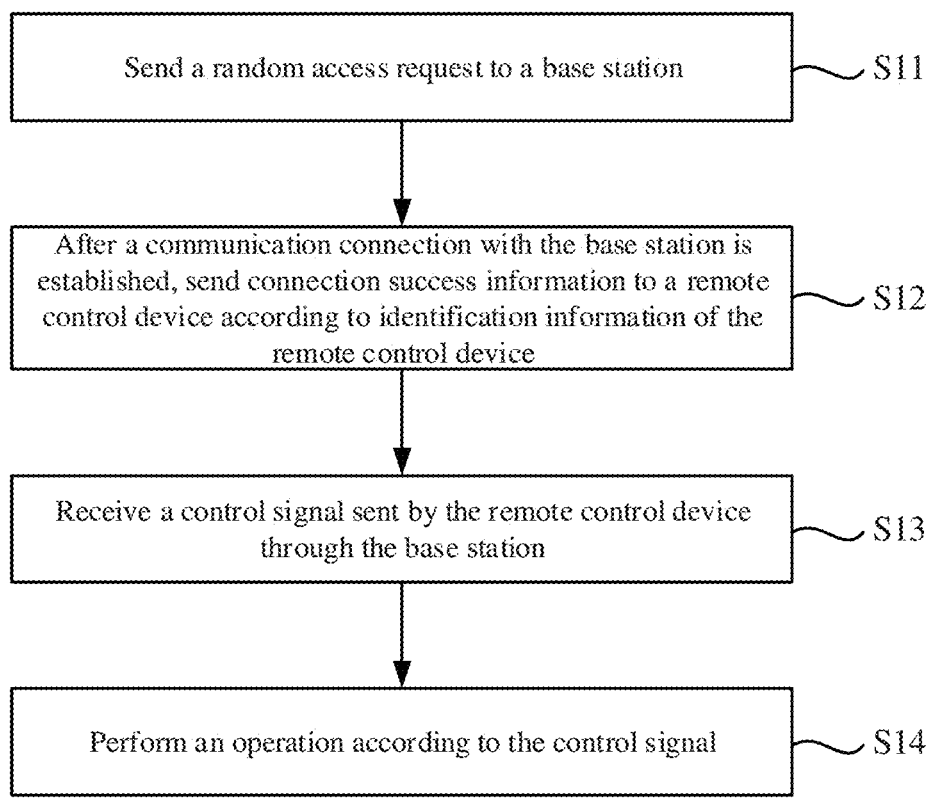
FIG. 1 is a schematic flow chart of a UAV control method according to an exemplary embodiment.

FIG. 1 is a schematic flow chart of a UAV control method according to an exemplary embodiment. The method in this embodiment may be applicable to a UAV capable of establishing a communication connection with a base station. The base station in this embodiment may be a base station in a cellular network, and the UAV may be a UAV mounted with a cellular network UAV-dedicated chip and establishing a communication connection with the base station through the chip, or may be a UVA equipped with a terminal and establishing a communication connection with the base station through the terminal.

As shown in FIG. 1, the method shown in the above embodiment includes the following steps.

In step S11, a random access request is sent to the base station.

In an embodiment, the UAV truly automatically send a random access request to the base station after starting, or may send a random access request to the base station according to a received connection instruction. The connection instruction may be sent by a remote control device to the UAV through communication manners such as wifi and Bluetooth, or the like.

In step S12, after establishing a communication connection with the base station, connection success information is sent to the remote control device according to identification information of the remote control device.

In an embodiment, the identification information of the remote control device may be pre-stored in the UAV. After the UAV establishes a communication connection with the base station, the remote control device may be determined according to the identification information of the remote control device.

For example, the identification information of the remote control device may be sent to the base station, so that the base station determines whether the remote control device has established a communication connection with the base station according to the identification information of the remote control device, and when the remote control device has established a communication connection with the base station, the UAV can receive information returned by the base station, and then send the connection success information to the base station, and the base station sends the connection success information to the remote control device.

When the remote control device has not established a communication connection with the base station, the connection success information may be sent to the remote control device by a communication manner different from through the base station, for example, by will, Bluetooth, or the like.

In step S13, a control signal sent by the remote control device through the base station is received.

In an embodiment, the remote control device may pre-store identification information of the UAV. After receiving the connection success information sent by the UAV, the remote control device may generate a control signal according to operation of the user on die remote control device (for example, by pushing the joystick on the remote control device and clicking the button on the remote control device), and send the control signal and the identification information of the UAV to the base station, so that the base station determines the UAV according to the identification information of the UAV and sends the control signal to the UAV.

In step S14, an operation is performed according to the control signal.

In an embodiment, after the UAV randomly accesses a certain base station in the cellular network, the UAV can send connection success information to the remote control device corresponding to the identification information of the remote control device, so that the remote control device can determine in a timely manner that the UAV has established a communication connection with the base station, and then can send a control signal to the UAV through the base station, to control the UAV to perform corresponding operation in time.

Also, comparing with implementing the control of the UAV by the remote control device through other communication manners, such as wifi, Bluetooth, or the like, implementing control of the UAV by the remote control device through the cellular network can allow the remote control device to control the UAV over a greater distance, and ensure the quality of communication between the remote control device and the UAV, since the cellular network and the corresponding base station are maintained and arranged by an operator and thus has wider coverage and greater stability.

Figure 2:
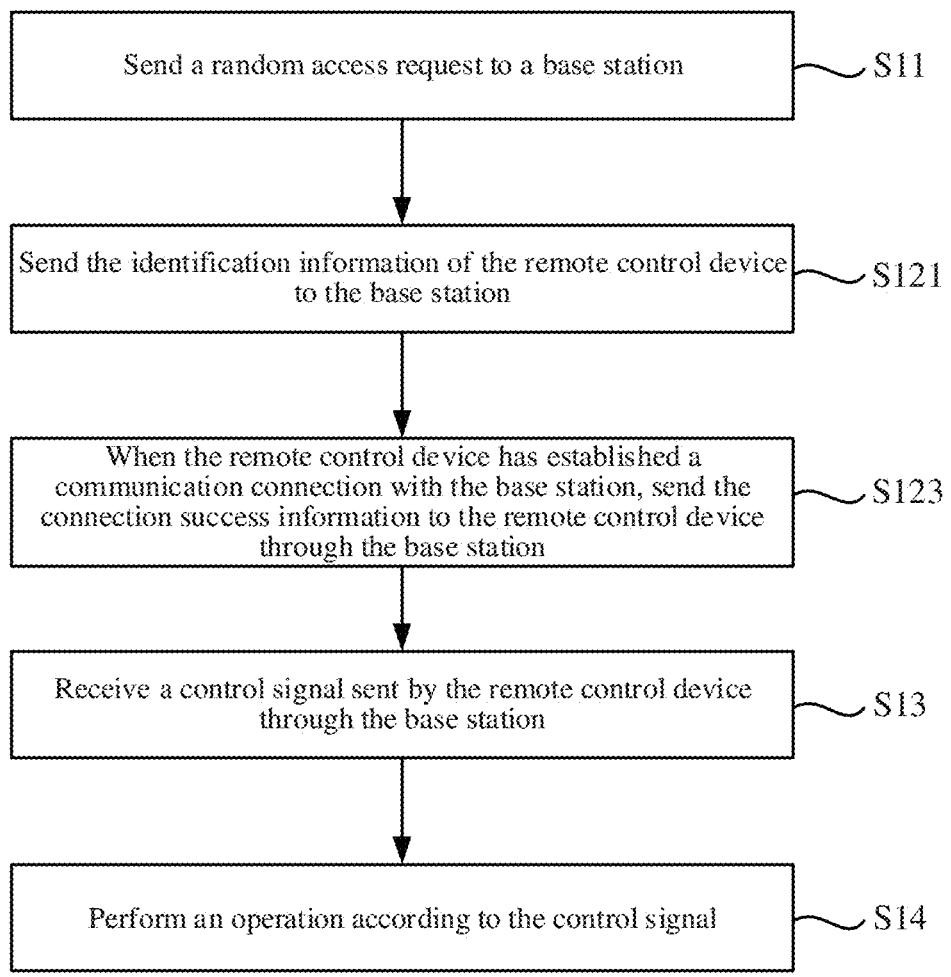
FIG. 2 is a schematic flow chart of another UAV control method according to an exemplary embodiment.

FIG. 2 is a schematic flow chart of another UAV control method according to an exemplary embodiment. As shown in FIG. 2, on the basis of the embodiment shown in FIG. 1, sending connection success information to the remote control device according to identification information of the remote control device includes the following steps.

In step S121, the identification information of the remote control device is sent to the base station.

In step S122, when the remote control device has established a communication connection with the base station, the connection success information is sent to the remote control device through the base station.

In an embodiment, the identification information of the remote control device may be pre-stored in the UAV. After establishing the communication connection with the base station, the UAV may send the identification information of the remote control device to the base station, so that the base station can determine whether the remote control device has established a communication connection with the base station according to the identification information of the remote control device. When the remote control device has established a communication connection with the base station, the base station can send the connection success information to the remote control device.

Based on this, when the remote control device has established a communication connection with the base station, the connection success information is sent to the remote control device through the base station. Since the cellular network provided by the base station is maintained by the operator, the communication quality is better than other communication manners, and it is more beneficial for quickly sending the connection success information to the remote control device.

Figure 3:
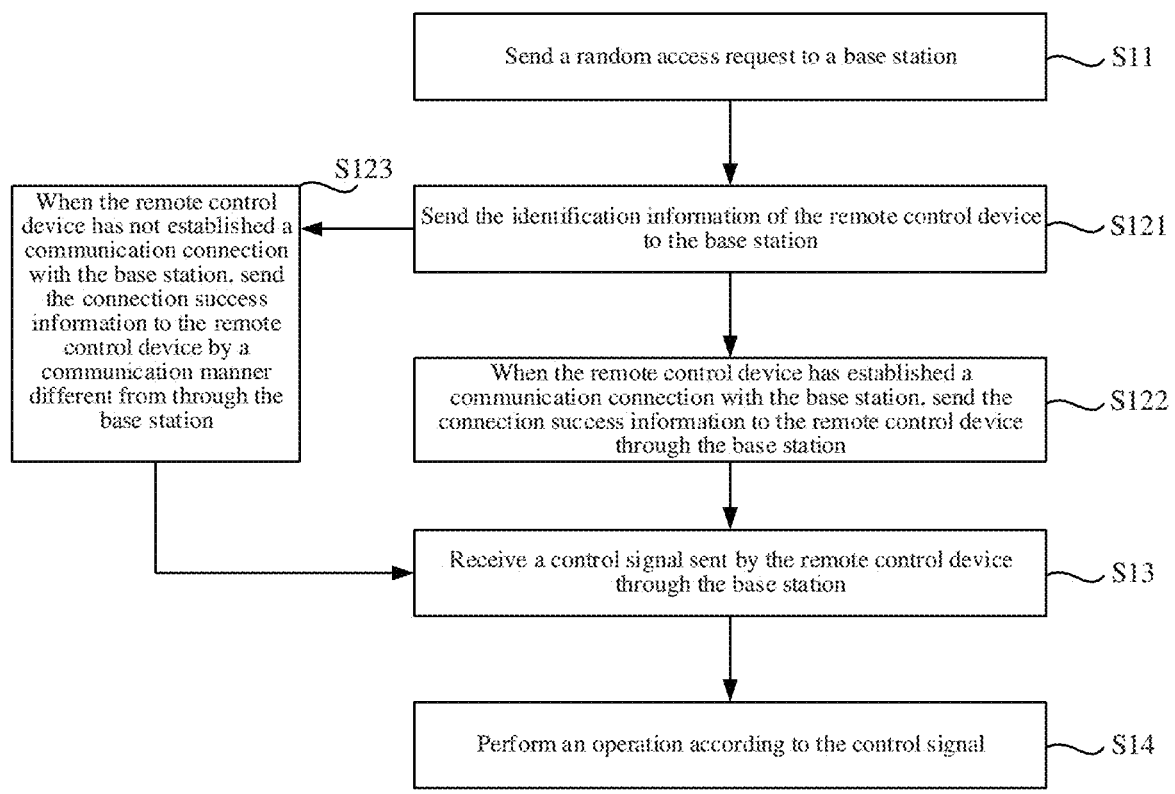
FIG. 3 is a schematic flow chart of still another UAV control method according to an exemplary embodiment.

FIG. 3 is a schematic flow chart of still another UAV control method according to an exemplary embodiment. As shown in FIG. 3, on the basis of the embodiment shown in FIG. 2, sending connection success information to the remote control device according to identification information of the remote control device further includes the following step.

In step S123, when the remote control device has not established a communication connection with the base station, the connection success information is sent to the remote control device by a communication manner different from through the base station.

In an embodiment, when the remote control device has not established a communication connection with the base station, the base station may return information to the UAV. According to the information, the UAV may determine that the remote control device has not established a communication connection with the base station, and then send the connection success information to the remote control device by a communication manner different from through the base station, such as wifi or Bluetooth, so that the remote control device can determine in a timely manner that the UAV has established a communication connection with the base station.

Figure 4:
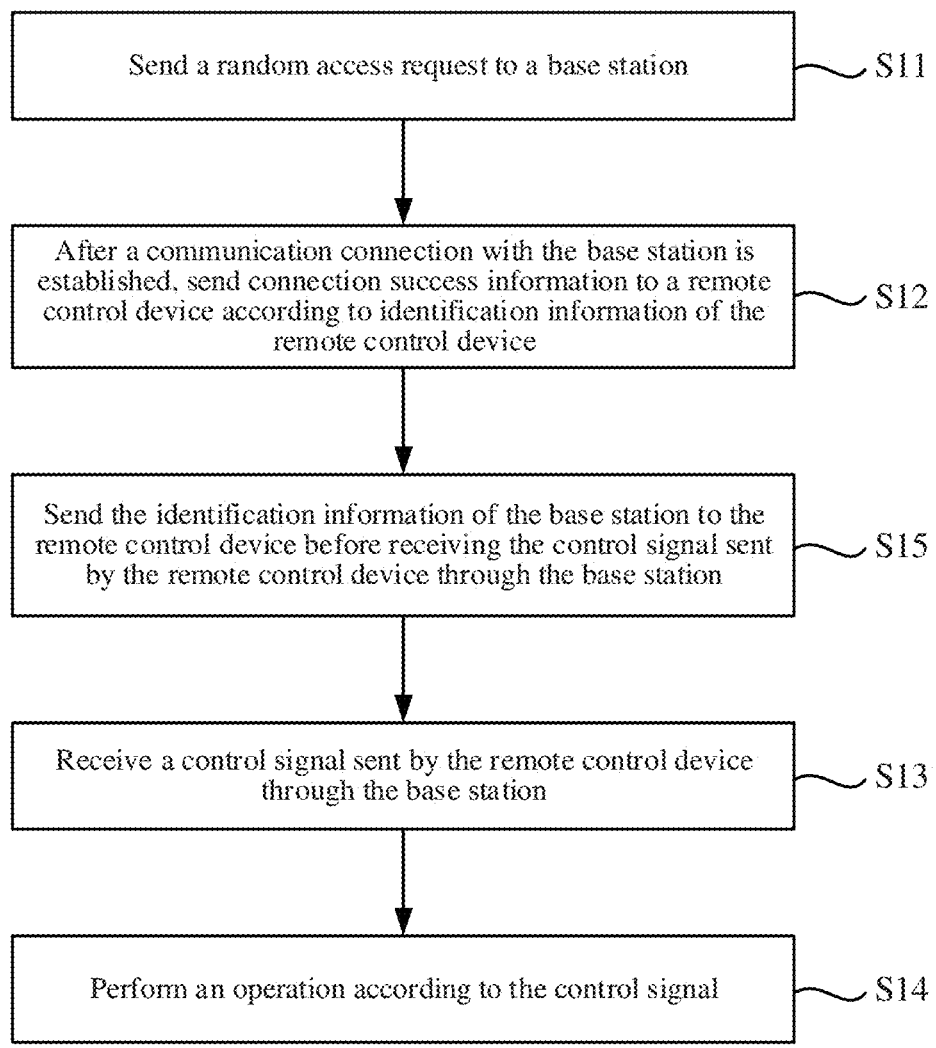
FIG. 4 is a schematic flow chart of still another UAV control method according to an exemplary embodiment.

FIG. 4 is a schematic flow chart of still another UAV control method according to an exemplary embodiment. As shown in FIG. 4, on the basis of the embodiment shown in FIG. 1, the UAV control method further includes the following step.

In step S15, identification information of the base station is sent to the remote control device before the control signal sent by the remote control device through the base station is received.

In an embodiment, after establishing a communication connection with a base station in a cellular network, the UAV may acquire identification information of the base station and send the identification information to the remote control device, so that the remote control device can search out the base station according to the identification information and can establish a communication connection directly with the base station, without establishing a connection with the base station indirectly through other base stations, to ensure better communication quality between the remote control device and the UAV.

For example, the UAV establishes a communication connection with a base station A, and the remote control device is located in the cellular network formed by the base station A and also located in the cellular network formed by a base station B. After receiving the identification information of the base station A sent by the UAV, the remote control device can establish a communication connection with the base station A, and send a control signal to the UAV through the base station A.

Comparing with establishing a communication connection with the base station B and sending the control signal to the UAV firstly through the base station B and then through the base station A, it can, on one hand, reduce the number of base stations that the control signal needs to pass through and thus reducing the load over the entire cellular network; on the other hand, it can shorten the transmission time of the control signal, to ensure that the control delay of the UAV is low. Besides, the fewer the base stations through which the control signal passes, the smaller the distortion is, so that it can also ensure better communication quality between the remote control device and the UAV.

It should be noted that step S15 may be performed in parallel with step S12, or may be performed after step S12, and the specific execution sequence may be set as needed.

Figure 5:
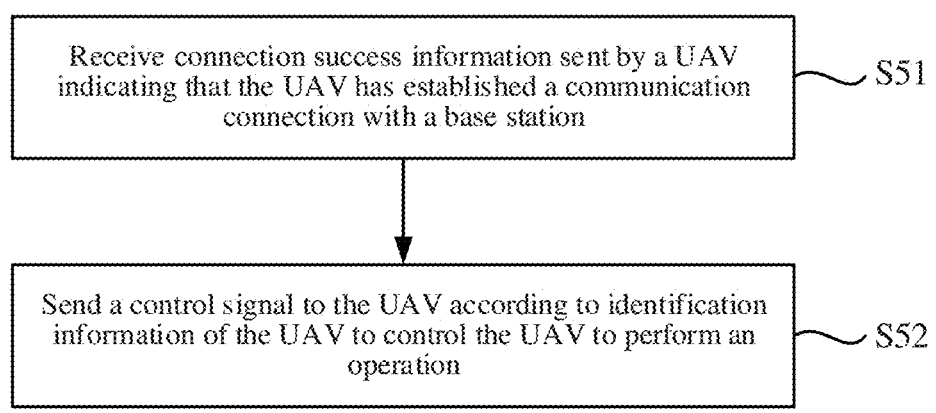
FIG. 5 is a schematic flow chart of a UAV control method according to an exemplary embodiment.

FIG. 5 is a schematic flow chart of a UAV control method according to an exemplary embodiment. The method in this embodiment may be applied to a remote control device capable of establishing a communication connection with a base station, and the remote control device may generate a control signal for controlling the UAV. The base station in this embodiment may be a base station in a cellular network. The above-mentioned UAV may be a UAV mounted with a cellular network UAV-dedicated chip and establishing a communication connection with the base station through the chip, or may be a UVA equipped with a terminal and establishing a communication connection with the base station through the terminal.

As shown in FIG. 5, the UAV control method includes the following steps.

In step S51, connection success information sent by the UAV indicating that the UAV has established a communication connection with the base station is received.

In an embodiment, the remote control device may receive the connection success information through the base station, or may also receive the connection success information through other communication manners, such as wifi, Bluetooth, and the like.

In step S52, a control signal is sent to the UAV according to identification information of the UAV, to control the UAV to perform an operation.

In an embodiment, the remote control device can receive the connection success information sent by the UAV after the UAV randomly accesses a certain base station in the cellular network, so as to determine in a timely manner that the UAV has established communication connection with the base station, and then can send a control signal to the UAV through the base station, so as to control the UAV to perform corresponding operation timely.

Figure 6:
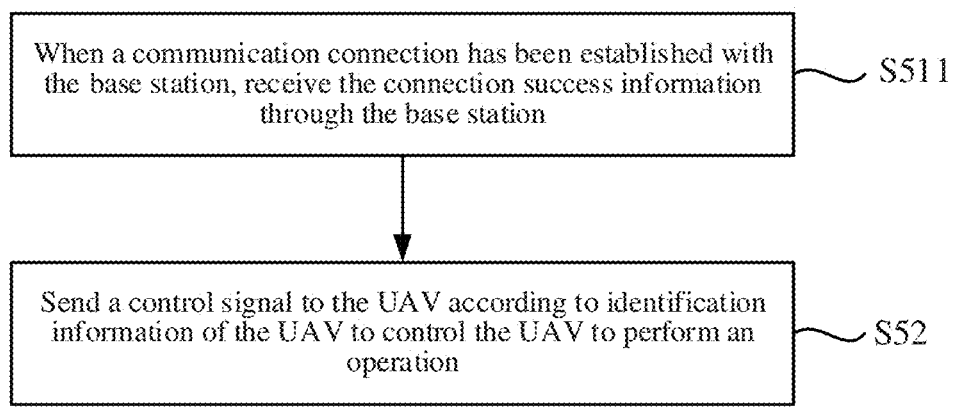
FIG. 6 is a schematic flow chart of another UAV control method according to an exemplary embodiment.

FIG. 6 is a schematic flow chart of another UAV control method according to an exemplary embodiment. As shown in FIG. 6, on the basis of the embodiment shown in FIG. 5, receiving connection success information sent by the UAV indicating that the UAV has established a communication connection with the base station includes the following step.

In step S511, when a communication connection has been established with the base station, the connection success information is received through the base station.

In one embodiment, when the remote control device has established a communication connection with the base station, the remote control device may receive the connection success information sent by the UAV through the base station. Since the cellular network provided by the base station is maintained by the operator, the communication quality is better than other communication manners, and it is more beneficial for the remote control device to stably receive the connection success information of the UAV.

Figure 7:
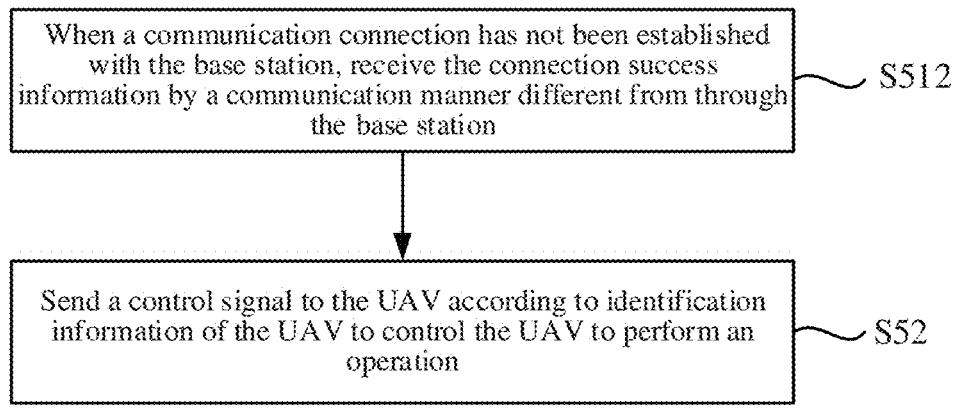
FIG. 7 is a schematic flow chart of still another UAV control method according to an exemplary embodiment.

FIG. 7 is a schematic flow chart of still another UAV control method according to an exemplary embodiment. As shown in FIG. 7, on the basis of the embodiment shown in FIG. 5, receiving connection success information sent by the UAV indicating that the UAV has established a communication connection with the base station includes the following step.

In step S512, when a communication connection has not been established with the base station, the connection success information is received by a communication manner different from through the base station.

In an embodiment, if the remote control device has not established a communication connection with the base station, the remote control device may receive the connection success information sent by the UAV through a communication manner different from through the base station, such as wifi or Bluetooth, so that it can determine in a timely manner that the UAV has established a communication connection with the base station.

Figure 8:
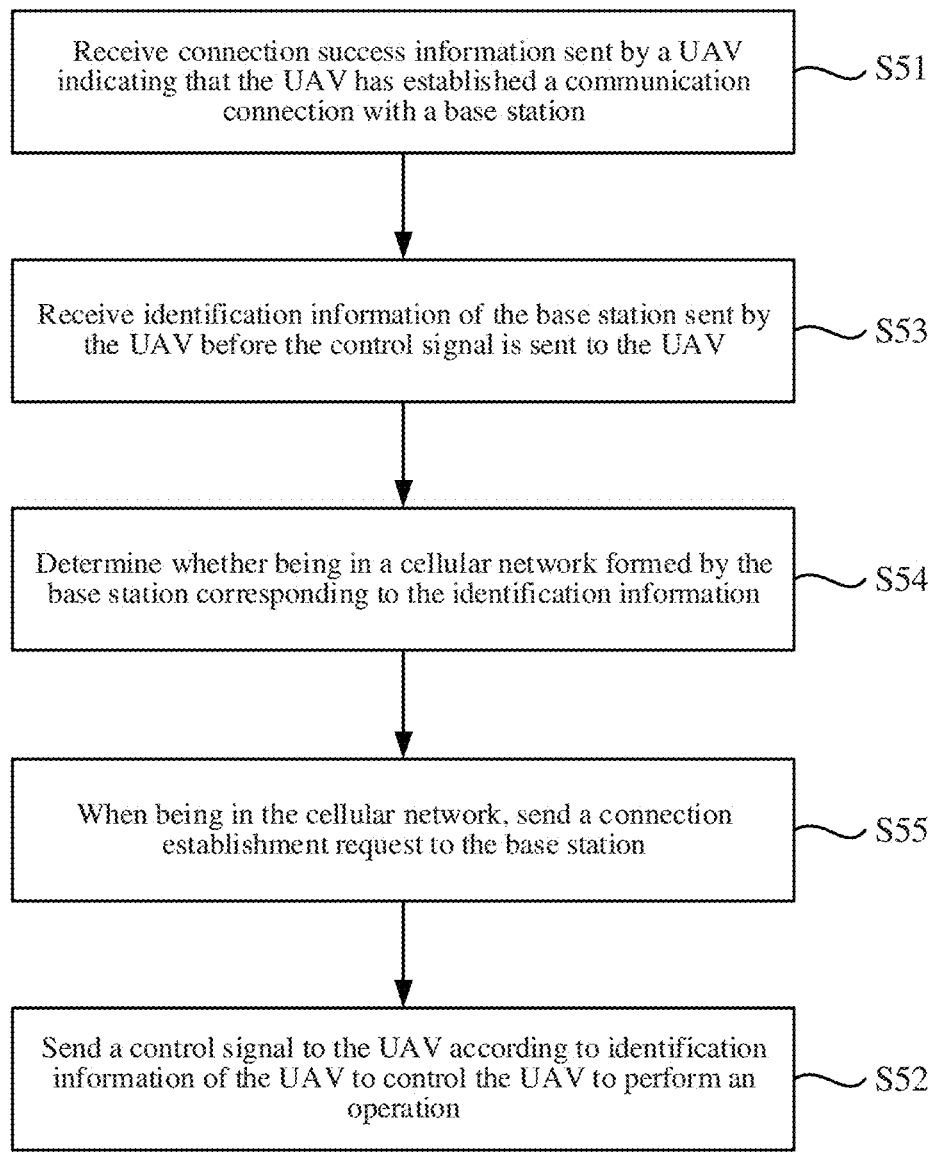
FIG. 8 is a schematic flow chart of still another UAV control method according to an exemplary embodiment.

FIG. 8 is a schematic flow chart of still another UAV control method according to an exemplary embodiment. As shown in FIG. 8, on the basis of the embodiment shown in FIG. 5, the UAV control method further includes the following steps.

In step S53, identification information of the base station sent by the UAV is received before the control signal is sent to the UAV.

In step S54, it is determined whether being in a cellular network formed by the base station corresponding to the identification information.

In step S55, when being in the cellular network, a connection establishment request is sent to the base station.

In an embodiment, the remote control device may receive the identification information of the base station sent by the UAV for establishing a communication connection with the UAV before the control signal is sent to the UAV, so that the remote control device can search out the base station according to the identification information. When being in the cellular network formed by the base station, the remote control device directly establishes a communication connection with the base station, without establishing a connection with the base station indirectly through other base stations, to ensure better communication quality between the remote control device and the UAV.

For example, the UAV establishes a communication connection with a base station A, and the remote control device is located in the cellular network formed by the base station A and also located in the cellular network formed by a base station B. After receiving the identification information of the base station A sent by the UAV, the remote control device can establish a communication connection with the base station A, and send a control signal to the UAV through the base station A.

Comparing with establishing a communication connection with the base station B and sending the control signal to the UAV firstly through the base station B and then through the base station A, it can, on one hand, reduce the number of base stations the control signal has to pass through and thus reducing the load over the entire cellular network; on the other hand, it can shorten the transmission time of the control signal, to ensure that the control delay of the UAV is low. Besides, the fewer the base stations through which the control signal passes, the smaller the distortion is, so that it can also ensure better communication quality between the remote control device and the UAV.

It should be noted that step S53 may be performed in parallel with step S51, or may be performed after step S51, and the specific execution sequence may be set as needed.

Figure 9:
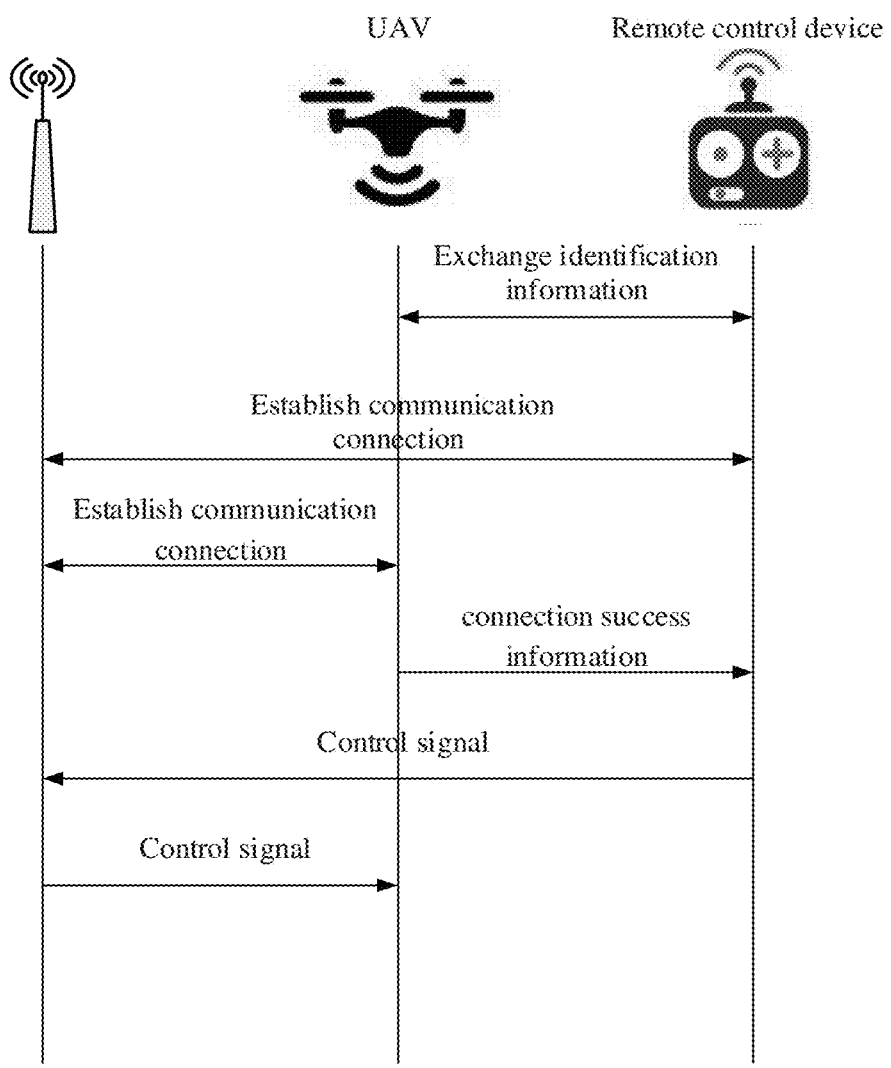
FIG. 9 is a detailed flowchart of a UAV control method according to an exemplary embodiment.

FIG. 9 is a detailed flowchart of a UAV control method according to an exemplary embodiment. Based on any of the embodiments shown in FIGS. 1 to 4 applicable to the UAV, and any of the embodiments shown in FIGS. 5 to 8 applicable to the remote control device, a process of a remote control device controlling a UAV through a base station is shown in FIG. 9.

The UAV and the remote control device can exchange their respective identification information in advance, so that the UAV pre-stores the identification information of the remote control device, and the remote control device pre-stores the identification information of the UAV. The remote control device and the UAV can respectively establish a communication connection with the base station. The sequence of establishing communication connection between the remote control device and the base station, and establishing communication connection between the UAV and the base station can be adjusted as desired. After the UAV establishes the communication connection with the base station, the UAV can send connection success information to the remote control device, so that the remote control device determines that the UAV has established a communication connection with the base station, and then sends a control signal for controlling the UAV to the base station, and the base station sends the control signal to the UAV to control the UAV to perform the operation.

Corresponding to the above embodiment of the UAV control method, the present disclosure also provides an embodiment of a UAV control apparatus.

Figure 10:
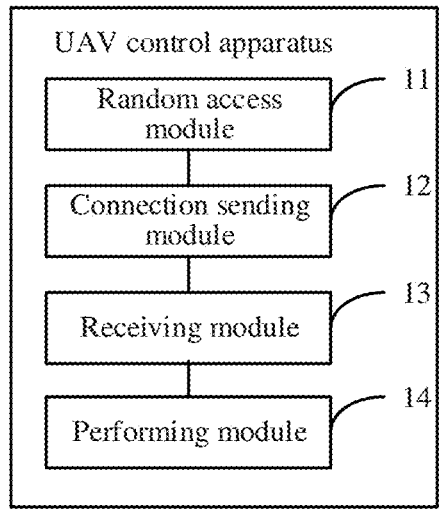
FIG. 10 is a schematic block diagram of a UAV control apparatus according to an exemplary embodiment.

FIG. 10 is a schematic block diagram of a UAV control apparatus according to an exemplary embodiment. As shown in FIG. 10, the UAV control apparatus includes:

a random access module 11 configured to send a random access request to the base station;

a connection sending module 12 configured to, after a communication connection with the base station is established, send connection success information to the remote control device according to identification information of the remote control device;

a receiving module 13 configured to receive a control signal sent by the remote control device through the base station; and a performing module 14 configured to perform an operation according to the control signal.

Figure 11:
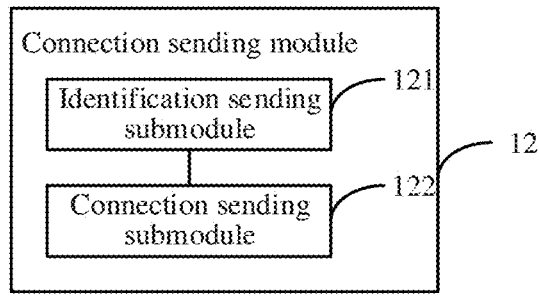
FIG. 11 is a schematic block diagram of a connection sending module according to an exemplary embodiment.

FIG. 11 is a schematic block diagram of a connection sending module according to an exemplary embodiment. On the basis of the embodiment shown in FIG. 10, the connection sending module 12 includes:

an identification sending submodule 121 configured send the identification information of the remote control device to the base station; and a connection sending submodule 122 configured to, when the remote control device has established a communication connection with the base station, send the connection success information to the remote control device through the base station.

Optionally, the connection sending submodule is further configured to, when the remote control device has not established a communication connection with the base station, send the connection success information to the remote control device by a communication manner different from through the base station.

Figure 12:
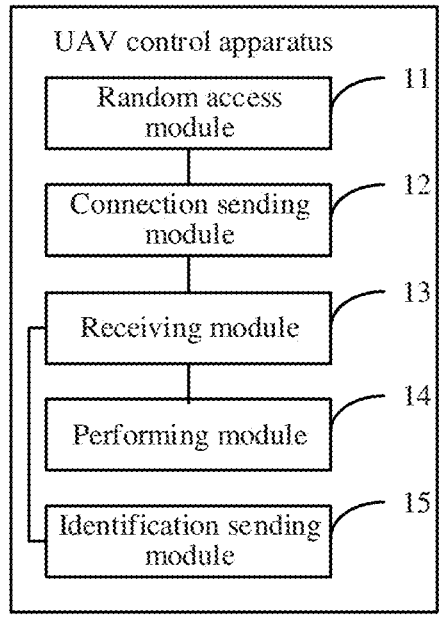
FIG. 12 is a schematic block diagram of still another UAV control apparatus according to an exemplary embodiment.

FIG. 12 is a schematic block diagram of still another UAV control apparatus according to an exemplary embodiment. On the basis of the embodiment shown in FIG. 10, the UAV control apparatus further includes:

an identification sending module 15 configured to send identification information of the base station to the remote control device before the control signal sent by the remote control device through the base station is received.

Figure 13:
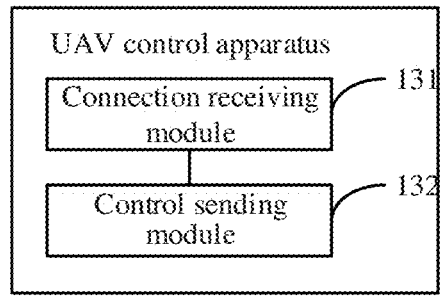
FIG. 13 is a schematic block diagram of a UAV control apparatus according to an exemplary embodiment.

FIG. 13 is a schematic block diagram of a UAV control apparatus according to an exemplary embodiment. As shown in FIG. 13, the UAV control apparatus includes:

a connection receiving module 131 configured to receive connection success information sent by the UAV indicating that the UAV has established a communication connection with the base station; and a control sending module 132 configured to send a control signal to the UAV according to identification information of the UAV, to control the UAV to perform an operation.

Optionally, the connection receiving module is configured to, when a communication connection has been established with the base station, receive the connection success information through the base station.

Optionally, the connection receiving module is configured to, when a communication connection has not been established with the base station, receive the connection success information by a communication manner different from through the base station.

Figure 14:
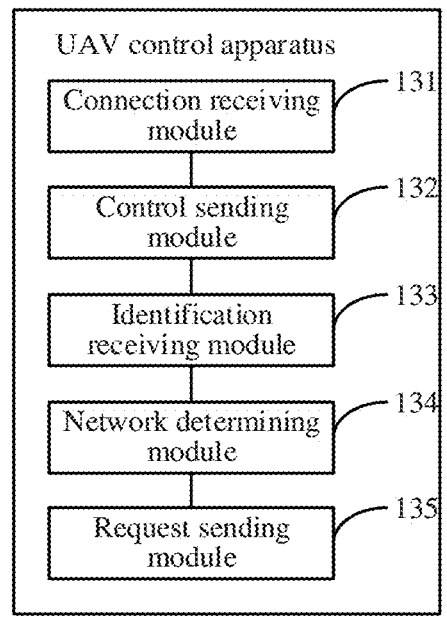
FIG. 14 is a schematic block diagram of another UAV control apparatus according to an exemplary embodiment.

FIG. 14 is a schematic block diagram of another UAV control apparatus according to an exemplary embodiment. As shown in FIG. 14, on the basis of the embodiment shown in FIG. 13, the UAV control apparatus further includes:

an identification receiving module 133 configured to receive identification information of the base station sent by the UAV before the control signal is sent to the UAV;

a network determining module 134 configured to determine whether being in a cellular network formed by the base station corresponding to the identification information; and a request sending module 135 configured to, when being in the cellular network, send a connection establishment request to the base station.

With regard to the apparatus in the above embodiments, the specific manner in which the respective modules perform the operations has been described in detail in the embodiments of the related methods, details of which will not be repeated herein.

For the apparatus embodiments, since they basically correspond to the method embodiments, reference may be made to the description of the method embodiments. The device embodiments described above are merely illustrative, wherein the modules described as separate components may or may not be physically separate, and the components displayed as modules may or may not be physical modules. That is, they may be located in one place, or can be distributed over multiple network modules. Some or all of the modules may be selected according to actual needs to achieve the objectives of the present disclosure. Those of ordinary skill in the art can understand and implement without any creative effort.

The present disclosure also provides a UAV, including:
a processor; and
a memory for storing processor executable instructions;
wherein the processor is configured to:
send a random access request to a base station;
after a communication connection with the base station is established, send connection success information to a remote control device according to identification information of the remote control device;
receive a control signal sent by the remote control device through the base station; and
perform an operation according to the control signal.

The present disclosure also provides a remote control device, including:
a processor; and
a memory for storing processor executable instructions;
wherein the processor is configured to:
receive connection success information sent by the UAV indicating that the UAV has established a communication connection with the base station; and
send a control signal to the UAV according to identification information of the UAV, to control the UAV to perform an operation.

The present disclosure also proposes a computer readable storage medium having stored thereon a computer program that, when executed by a processor, implements the following steps:
sending a random access request to a base station;
after a communication connection with the base station is established, sending connection success information to a remote control device according to identification information of the remote control device;

receiving a control signal sent by the remote control device through the base station; and performing an operation according to the control signal.

The present disclosure also proposes a computer readable storage medium having stored thereon a computer program that, when executed by a processor, implements the following steps:

receiving connection success information sent by the UAV indicating that the UAV has established a communication connection with the base station; and sending a control signal to the UAV according to identification information of the UAV, to control the UAV to perform an operation.

Figure 15:
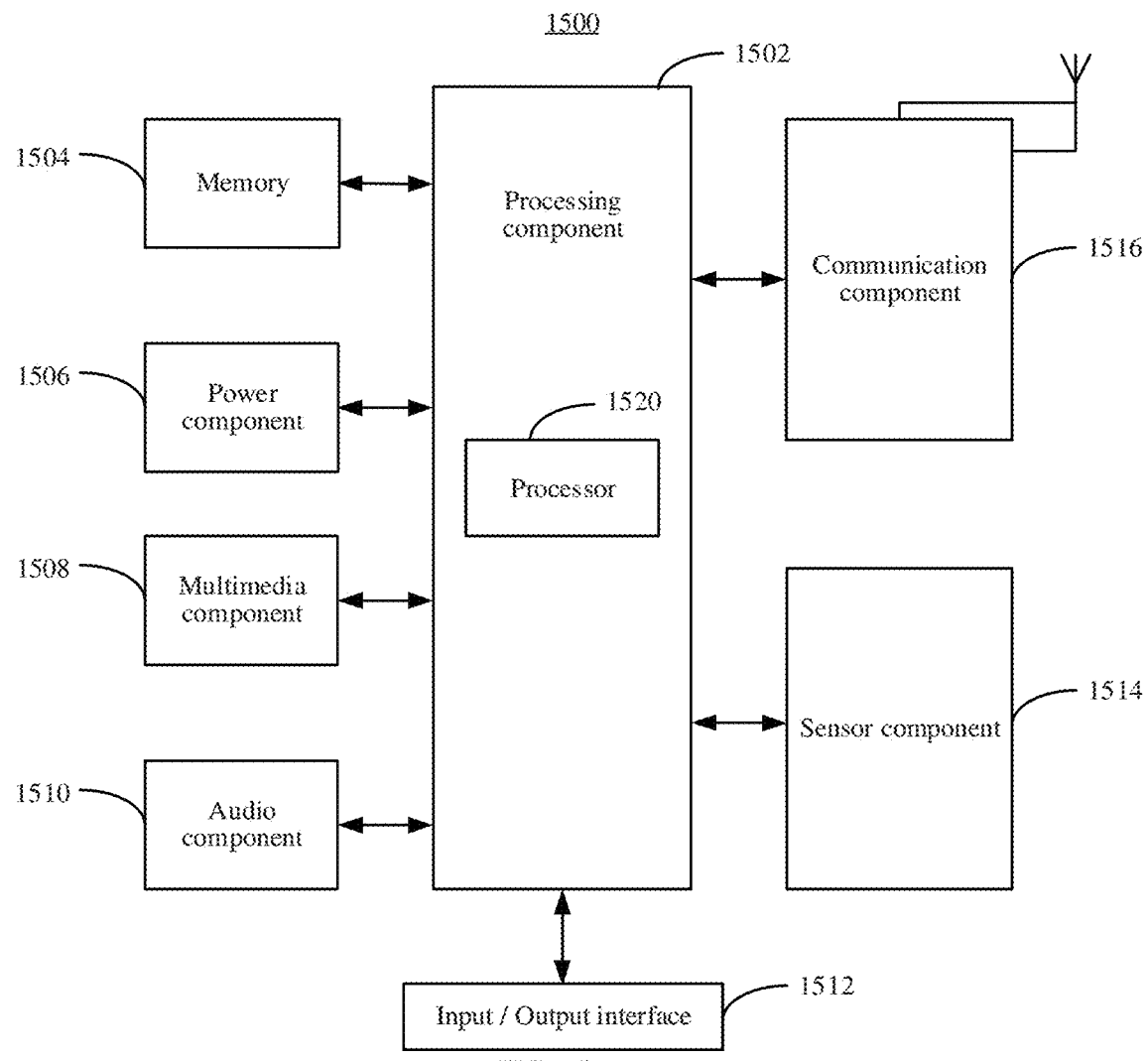
FIG. 15 is a schematic block diagram of a device for UAV control according to an exemplary embodiment.

FIG. 15 is a block diagram of a device 1500 for UAV control according to an exemplary embodiment. For example, the device 1500 can be a mobile phone, a computer, a digital broadcast terminal, a messaging device, a game console, a tablet device, a medical device, a fitness device, a personal digital assistant, and the like.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the device 1500, such as the operations associated with display, phone call, data communications, camera operations, and recording operations. The processing component 1502 may include one or more processors 1520 to execute instructions, to perform all or part of the steps of the above method. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, telephone directory data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. When the device 1500 is in an operation mode, such as a shooting mode or a video mode, the front camera and/or the rear camera can receive external multimedia data. Each front and rear camera can be a fixed optical lens system or have focal length and optical zoom capability The audio component 1510 is configured to output and/or input audio signals. For example, the audio component 1510 includes a microphone ("MIC") configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. These buttons may include, but are not limited to, a home button, a volume button, a start button, and a lock button.

The sensor component 1514 includes one or more sensors to provide status assessments of various aspects of the device 1500. For instance, the sensor component 1514 may detect an on/off status of the device 1500, relative positioning of components, e.g., the display and the keypad, of the device 1500, a change in position of the device 1500 or a component of the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the device 1500 and other devices. The device 1500 can access a wireless network based on a communication standard, such as WiFi, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1500 may be implemented with one or more application specific integrated circuits (ASICs), digital signal processors (DSPs), digital signal processing devices (DSPDs), programmable logic devices (PLDs), field programmable gate arrays (FPGAs), remote control devices, micro remote control devices, microprocessors, or other electronic components, to perform the above method.

In exemplary embodiments, there is also provided a non-transitory computer-readable storage medium including instructions, such as included in the memory 1504, executable by the processor 1520 in the device 1500 to perform the above method. For example, the non-transitory computer-readable storage medium may be a ROM, a random access memory (RAM), a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An unmanned aerial vehicle (UAV) control method, comprising:
   sending a random access request to a base station;
   sending connection success information to a remote control device according to identification information of the remote control device, after a communication connection with the base station is established;
   receiving a control signal sent by the remote control device through the base station; and
   performing an operation according to the control signal,
   wherein sending the connection success information to the remote control device according to the identification information of the remote control device comprises:
   sending the identification information of the remote control device to the base station;
   when the remote control device has established a communication connection with the base station, sending the connection success information to the remote control device through the base station; and
   when the remote control device has not established a communication connection with the base station, sending the connection success information to the remote control device by a communication manner different from through the base station.

2. The method according to claim 1, further comprising:
   sending identification information of the base station to the remote control device before receiving the control signal sent by the remote control device through the base station.

3. An unmanned aerial vehicle (UAV) control method, comprising:
   receiving connection success information sent by a UAV indicating that the UAV has established a communication connection with a base station; and
   sending a control signal to the UAV according to identification information of the UAV to control the UAV to perform an operation,
   wherein receiving the connection success information sent by the UAV comprises:
   when a remote control device has established a communication connection with the base station, receiving the connection success information through the base station; and
   when the remote control device has not established a communication connection with the base station, receiving the connection success information by a communication manner different from through the base station.

4. The method according to claim 3, further comprising:
   receiving identification information of the base station sent by the UAV before the control signal is sent to the UAV;
   determining whether the remote control device is in a cellular network formed by the base station corresponding to the identification information; and
   sending a connection establishment request to the base station, when the remote control device is in the cellular network.

5. An unmanned aerial vehicle (UAV), comprising:
   a processor; and
   a memory for storing instructions executable by the processor;
   wherein the processor is configured to:
   send a random access request to a base station;
   after a communication connection with the base station is established, send connection success information to a remote control device according to identification information of the remote control device;
   receive a control signal sent by the remote control device through the base station; and
   perform an operation according to the control signal,
   wherein in sending the connection success information to the remote control device according to the identification information of the remote control device, the processor is further configured to:
   send the identification information of the remote control device to the base station;
   when the remote control device has established a communication connection with the base station, send the connection success information to the remote control device through the base station; and
   when the remote control device has not established a communication connection with the base station, send the connection success information to the remote control device by a communication manner different from through the base station.

6. The UAV according to claim 5, wherein the processor is further configured to:
   send identification information of the base station to the remote control device before the control signal sent by the remote control device through the base station is received.

7. A remote control device, comprising:
   a processor; and
   a memory for storing instructions executable by the processor;
   wherein the processor is configured to perform the method according to claim 3.

8. The remote control device according to claim 7, wherein the processor is further configured to, when a] communication connection has been established with the base station, receive the connection success information through the base station.

9. The remote control device according to claim 7, wherein the processor is further configured to, when a communication connection has not been established with the base station, receive the connection success information by a communication manner different from through the base station.

10. The remote control device according to claim 7, wherein the processor is further configured to:
   receive identification information of the base station sent by the UAV before the control signal is sent to the UAV;
   determine whether the remote control device is in a cellular network formed by the base station corresponding to the identification information; and
   when the remote control device is in the cellular network, send a connection establishment request to the base station.

11. A non-transitory computer readable storage medium having stored thereon a computer program that, when executed by a processor of a device, causes the device to perform the method according to claim 1.

12. A non-transitory computer readable storage medium having stored thereon a computer program that, when executed by a processor of a device, causes the device to perform the method according to claim 3.

* * * * *